United States Patent Office 3,470,274
Patented Sept. 30, 1969

3,470,274
THERMOPLASTIC FILM PRODUCTION
Denis James Henry Sandiford, Welwyn, and John Alan Elliott Kail, Harpenden, England, assignors to Imperial Chemical Industries Limited, London, England, a corporation of Great Britain
Filed July 29, 1966, Ser. No. 568,958
Claims priority, application Great Britain, July 30, 1965, 32,703/65; Jan. 24, 1966, 3,101/66
Int. Cl. B29f 3/06
U.S. Cl. 264—22                    8 Claims

ABSTRACT OF THE DISCLOSURE

In a process for extruding thermoplastic film means are provided for maintaining substantially free from deposit a wire electrode which is used to deposit an electrostatic charge on to the upper surface of the film. In a preferred embodiment the wire electrode is continuously unwound from a first reel on to a second reel. The wire electrode is kept substantially free of deposit by means of either a scraper plate or a current of air which is passed between the film and the wire electrode to prevent deposits from forming.

---

Figure 1:
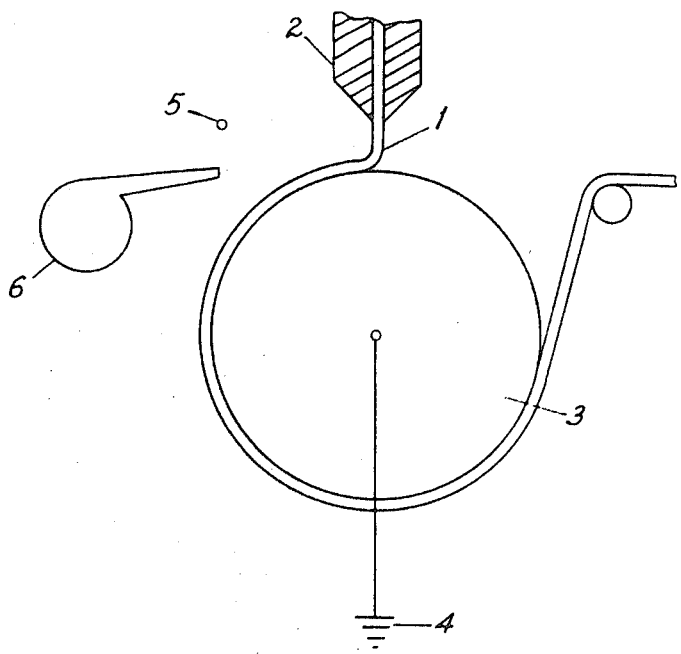

This invention relates to thermoplastic film production and improvements therein.

Such film may be produced by the extrusion of polymer through a die onto a casting drum. It is essential that there should be adequate contact between the freshly extruded film and the casting drum in order to ensure good heat transfer.

A known method of ensuring such contact is by depositing an electrostatic charge on the upper surface of the extruded film while maintaining the casting drum at a low potential, e.g., by allowing the drum to be earthed. The polymer composition which is extruded from the die often contains additives, e.g., heat or U.V. stabilizers or antistatic agents and these may be volatile at the temperature of extrusion.

When an electrostatic pinning system which normally uses a wire electrode is used in conjunction with such a composition containing volatile additives, it is found that degradation products of these additives are deposited on the electrode and this not only raises the threshold ionization potential for the electrode but also markedly alters the appearance of the discharge between the wire and the film. The consequences are that the efficiency of pinning is reduced leading to an irregular of patchy adherence of the film to the casting drum and a general and "noisy" blue glow fills the space betwen the wire and the film instead of there being present only a faint "silent" glow in the immediate vicinity of the wire itself.

It is an object of the present invention to overcome the above difficulty.

Accordingly we provide a process for quenching a freshly extruded thermoplastic composition which comprises extruding a molten thermoplastic film forming polymeric composition on to a moving casting surface and depositing on the upper surface of the film an electrostatic charge from an electrode situated near to said film surface and maintained at a large electrostatic potential difference from the casting surface so that the film is caused to adhere to said casting surface, in which means are applied to maintain said electrode substantially free from deposit arising from condensed vapours of volatile matter present in said film forming composition or the decomposition products of said volatile matter. By "substantially free from deposit" we mean that the electrode, since it does not become contaminated by deposit, continues to function successfully for a considerable time, e.g., eight hours' running time, i.e., a time considerably longer than that required to set the machine operating uniformly, without there being any need to adjust the potential difference between the wire and the cast film to maintain satisfactory performance. Signs of a deterioration in performance show up in the appearance of the cast film, e.g., short transverse streaks consisting of air bubbles may appear on the film. If the film is subsequently drawn these bubbles may initiate breaks in the film. A further indication of unsatisfactory working is the appearance on the electrode wire of a visible darkcolored deposit. In the successful working of the present invention no such deposit occurs, although a very thin uniform straw-colored deposit which does not significantly affect the efficiency of pinning may be formed.

It is preferred to use a wire electrode and this may be maintained substantially free from deposit by the means of a cleaning device, e.g., a scraper plate having an orifice of sufficient diameter just to allow passage of the clean wire, or a bath containing a solvent for the deposit, may be periodically passed along the wire.

Alternatively, the wire may be reciprocated through such a cleaning device or the wire may be in the form of an endless band which may be continuously passed through such a cleaning device.

In another and preferred alternative, a clean wire is continuously unwound from one reel at one side of the die orifice and wound onto a second reel at the other side. Since a suitable speed of transverse movement of the wire which prevents the dwell time of the wire above the extrudate being sufficient to accumulate substantially any deposit, is about 1 ft./hour, such a system will run for very many hours before replacement with a fresh coil of clean wire is required and the replacement or cleaning of the wire ceases to be a limiting factor in the extended running of the equipment.

Such devices will, of course, be at the same potential as the electrode wire and will therefore require to be insulated.

Another method of maintaining the electrode substantially free from deposit comprises preventing the vapour arising from the volatile additives from reaching the electrode or reducing the concentration of such vapour in the vicinity of the electrode to negligible proportions.

This may conveniently be effected by passing a current of air between the film and the electrode. Since such a current of air will normally impinge on the die it is desirable that it should be at approximately the same temperature as the die, that is the temperature of the extruded material, since otherwise there would be set up a temperature differential between different parts of the die which could result in variations in the profile of the extruded film.

Any conventional system for producing a current of hot air may be used, e.g., a fan blowing air over a heated wire or grille.

Alternatively, a suction device may be mounted near to the die to remove the volatiles.

Any thermoplastic film may be used in the present invention for example films of polymers and copolymers of polyethylene, polypropylene and other polyolefines, polyethylene terephthalate, polyamides, polyvinyl chloride, polyoxymethylene or poly-3,3-biscolhromethyl oxacyclobutane.

Examples of volatile additives are antistatic agents and antistatic promoting agents, e.g., fatty acid amides such as oleamide or erucimide and quaternary ammonium and phosphonium salts which contain a long chain of carbon atoms.

Examples of U.V. stabilizers are benzophenones, salicylates and benzotriazoles and examples of heat stabilizers are dialkyl thiodiacylates and condensates of a phenol with an aldehyde or a ketone.

The films produced according to this invention may, if orientable, subsequently be drawn in one or more directions. They may be also slit into narrow tapes before or after drawing preferably before drawing as described in our copending British patent application No. 1,424/66.

Figure 2:
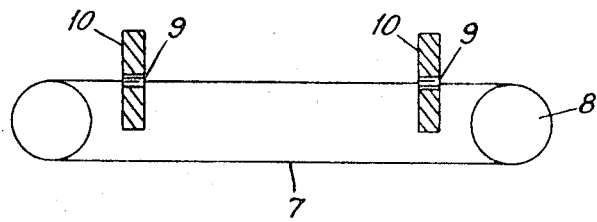

The invention will now be described with reference to the accompanying drawings in which FIGURE 1 is a diagrammatic sectional elevation showing the invention and FIGURE 2 shows an alternative electrode system.

In FIGURE 1, polypropylene film 1 containing 0.5% of a volatile U.V. stabilizer is extruded from die 2 on the chilled quenching drum 3. Quenching drum 3 is connected to earth as shown at 4 and wire 5 which is connected to a source of high potential forms the electrode. Hot air blower 6 which is made up of a centrifugal fan and an electric heating element directs a stream of air at a temperature of from 200–250° C. between the electrode and the quenching film.

In FIGURE 2, the electrode is formed by wire 7 which is in the form of an endless band driven by a rotating pulley 8 through orifices 9 in scraper plates 10. The invention is illustrated but in no way limited by the following examples. In the examples all percentages are by weight.

EXAMPLE 1

Polypropylene containing 0.5% 2-hydroxy-4-methoxybenzophenone as ultraviolet light stabilizer was extruded and cast as film 0.006 inch thick on a steel drum maintained at 75° C. and running at a circumferential speed or 45 ft./minute. The width of the cast film was 9 inches and the hourly mass of film passing between wire and drum in the arrangement indicated schematically in FIGURE 1 was about 60 lb./hour. The amounts of U.V. stabilizer found by analysis before extrusion and afterwards were respectively 0.47% and 0.27%. The electrode comprised a nickel chrome wire of 0.005 inch diameter and the initial potential difference between the electrode and the wire was 4.5K volts, the total current being 150 $\mu$amps. The velocity of the air current produced by the blower was initially adjusted by choking down the air intake of the blower so that the upper surface of the molten film should not be roughened by the impact of turbulent air; the temperature was adjusted by variation of the current supplied to the heating elements to 280° C., i.e., the die temperature. Alternate periods of 8 hours were occupied by running with the blower on and then off. It was found that with the blower on trouble-free running was possible for at least 8 hours, i.e., no adjustment of the position of the wire nor alternation of the potential difference was necessary. At the end of the period of running with the blower on the uniform deposit on the wire was very slight, being yellowish brown in color. When the blower was switched off the wire begain to deteriorate rapidly; after an hour it was visibly darkening and becoming patchy and after 3 to 4 hours it became necessary to remove and clean or replace the wire because the quality of cast film was no longer acceptable.

EXAMPLE 2

The same extrusion conditions of rate and temperature were used as in the case of Example 1. A nickel chrome wire of the same diameter and at the same potential as in Example 1 was used and this was mounted in such a way that it could be unwound from a first reel at one side of the extruding film and wound onto a second reel at the other side by a manually operable electrically insulated handle attached to the second reel. This was wound at 15 minute intervals by an operator, about 3 inches of wire being wound on each occasion.

Using the equipment it was possible to obtain extended trouble-free running.

EXAMPLE 3

In this example the same polymer composition was used as in the previous examples. The width of the cast film was 18 inches and the extrusion rate was 150 lb./hour. The electrode was a Nichrome wire of diameter 0,009 inch which, as in Example 2 was fed from a first reel at one side of the extruding film to a second reel at the other side. The takeoff reel was electrically driven so that the rate of travel of the wire was 18 inches per hour.

Extended trouble-free running was attained.

We claim:

1. A process for quenching a freshly extruded thermoplastic composition which comprises extruding a molten thermoplastic film forming polymeric composition on to a moving casting surface, depositing on the upper surface of the film an electrostatic charge from a wire electrode situated near to said film surface and maintained at a large electrostatic potential difference from the casting surface so that the film is caused to adhere to said casting surface, and maintaining said wire electrode substantially free from deposit arising from condensed vapors of volatile matter present in said film forming composition or the decomposition products of said volatile matter by continuously unwinding said wire electrode from a first reel positioned at one side of the die orifice from which the thermoplastic film is extruded, winding said wire on to a second reel positioned at the other side of the die orifice at a speed which prevents the dwell time of the wire electrode above the extruded film from being sufficient for substantially any deposit to accumulate on the said wire.

2. A process according to claim 1 in which said wire electrode is maintained substantially free from deposit by the means of a scraper plate having an orifice of sufficient diameter just to allow passage of the clean wire.

3. A process according to claim 2 in which said electrode wire is reciprocated through said scraper plate.

4. A process according to claim 2 in which said electrode wire is in the form of an endless band which is continuously passed through said scraper plate.

5. A process according to claim 1 in which said wire is maintained substantially free from deposit by means of a bath containing a solvent for the deposit which is periodically passed along the wire.

6. A process according to claim 5 in which said electrode wire is reciprocated through said bath.

7. A process according to claim 5 in which said electrode wire is in the form of an endless band which is continuously passed through said bath.

8. In a process for quenching a freshly extruded thermoplastic composition which comprises extruding a molten thermoplastic film forming polymeric composition on to a moving casting surface, depositing on the upper surface of the film an electrostatic charge from a wire electrode situated near to said film surface and maintained at a large electrostatic potential difference from the casting surface so that the film is caused to adhere to said casting surface the improvement consistng of maintaining said wire electrode substantially free from deposit arising from condensed vapors of volatile matter present in said film forming composition or the decomposition products of said volatile matter by passing a current of air between the upper surface of said thermoplastic film and the wire electrode so that said volatile matter is substantially prevented from reaching the electrode, said current of air being maintained at approximately the same temperature as the die orifice through which the thermoplastic film is extruded.

References Cited

UNITED STATES PATENTS

| 2,556,247 | 6/1951 | Zeigler | 264—169 |
| 3,196,063 | 7/1965 | Paquin | 161—250 |
| 3,223,757 | 12/1965 | Owens | 264—22 |
| 3,244,786 | 4/1966 | Bild | 264—176 |
| 3,274,302 | 9/1966 | Anderson | 264—22 |

ROBERT F. WHITE, Primary Examiner
RICHARD R. KUCIA, Primary Examiner

U.S. Cl. X.R.

204—168, 312; 264—169, 216